United States Patent
Nam et al.

(10) Patent No.: US 9,018,915 B2
(45) Date of Patent: Apr. 28, 2015

(54) BATTERY PROTECTION CIRCUIT AND METHOD OF CONTROLLING THE SAME

(75) Inventors: Hyun-Seok Nam, Yongin-si (KR); Jong-Woon Yang, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 429 days.

(21) Appl. No.: 13/461,320

(22) Filed: May 1, 2012

(65) Prior Publication Data

US 2012/0280661 A1 Nov. 8, 2012

(30) Foreign Application Priority Data

May 4, 2011 (KR) ........................ 10-2011-0042622

(51) Int. Cl.
*H02J 7/00* (2006.01)

(52) U.S. Cl.
CPC ............. *H02J 7/0031* (2013.01); *H02J 7/0014* (2013.01); *H02J 7/0021* (2013.01); *H02J 7/0026* (2013.01)

(58) Field of Classification Search
CPC ..... H02J 7/0014; H02J 7/0021; H02J 7/0026; H02J 7/0031
See application file for complete search history.

(56) References Cited

U.S. PATENT DOCUMENTS

| 6,194,871 | B1 * | 2/2001 | Haraguchi et al. ............ 320/134 |
| 6,492,791 | B1 | 12/2002 | Saeki et al. |
| 6,989,652 | B2 * | 1/2006 | Saeki et al. .................... 320/134 |
| 8,314,589 | B2 * | 11/2012 | Hur ............................... 320/112 |
| 2008/0067213 | A1 | 3/2008 | Shima et al. |
| 2008/0258691 | A1 * | 10/2008 | Lai et al. ........................ 320/164 |
| 2012/0256599 | A1 * | 10/2012 | Gu .................................. 320/149 |
| 2012/0280572 | A1 * | 11/2012 | Li et al. ............................ 307/77 |
| 2013/0093383 | A1 * | 4/2013 | Kim et al. ...................... 320/107 |
| 2014/0035515 | A1 * | 2/2014 | Wang et al. .................... 320/107 |

FOREIGN PATENT DOCUMENTS

| JP | 2008-68356 A | 3/2008 |
| KR | 10-2004-0064958 A | 7/2004 |
| KR | 10-2008-0034321 A | 4/2008 |

OTHER PUBLICATIONS

Korean Notice of Allowance dated Apr. 29, 1013 for Korean Patent Application No. KR 10-2011-0042622 which corresponds to captioned U.S. Appl. No. 13/461,320.
Korean Office Action dated Oct. 30, 2012 for Korean Patent Application No. KR 10-2011-0042622 which corresponds to captioned U.S. Appl. No. 13/461,320.

* cited by examiner

Primary Examiner — Nha Nguyen
(74) Attorney, Agent, or Firm — Knobbe, Martens, Olson & Bear, LLP

(57) ABSTRACT

A battery protection circuit and a method of controlling the same is disclosed. The battery protection circuit includes: a battery management system for controlling charging and discharging of a battery; and a reset control circuit for controlling a reset operation of the battery management system. The battery management system includes: a reset terminal to which a first voltage for determining reset is applied; and a reset prevention terminal to which a second voltage for determining reset prevention of the battery management system is applied. The reset control circuit is connected between the reset terminal and the reset prevention terminal to control the applying of the first voltage to the reset prevention terminal. Accordingly, an unintended reset operation of the battery management system may be prevented.

13 Claims, 4 Drawing Sheets

BATTERY PROTECTION CIRCUIT AND METHOD OF CONTROLLING THE SAME

CROSS-REFERENCE TO RELATED APPLICATIONS

This application claims the benefit of Korean Patent Application No. 10-2011-0042622, filed on May 4, 2011, in the Korean Intellectual Property Office, the disclosure of which is incorporated herein in its entirety by reference.

BACKGROUND

1. Field

The disclosed technology relates to a battery protection circuit and a method of controlling the same.

2. Description of the Related Technology

Because portable electronic devices, such as mobile phones, digital cameras, and laptops, are widely used, batteries for supplying power to operate the portable electronic devices are actively developed. A battery in the form of a battery pack along with a protection circuit for controlling charging and discharging of the battery is generally used. The battery or the protection circuit may malfunction while charging or discharging the battery pack, and thus various devices are included in the protection circuit to stably control the charging and discharging of the battery.

SUMMARY OF CERTAIN INVENTIVE ASPECTS

One inventive aspect is a battery protection circuit. The circuit includes a battery management system configured to control charging and discharging of a battery, and a reset control circuit configured to control resetting the battery management system. The battery management system includes a reset terminal to which a first voltage for determining reset is applied, and a reset prevention terminal to which a second voltage for determining reset prevention of the battery management system is applied. The reset control circuit is connected between the reset terminal and the reset prevention terminal to control applying the first voltage to the reset prevention terminal.

Another inventive aspect is a battery protection circuit. The circuit includes a battery management system configured to control charging and discharging of a battery, and a reset control circuit configured to control resetting of the battery management system. The battery management system includes a reset prevention terminal to which a first voltage for determining reset prevention of the battery management system is applied, and a reset control terminal for outputting a reset control signal for controlling reset of the battery management system. The reset control circuit controls application of a voltage to the reset prevention terminal according to the reset control signal.

Another inventive aspect is a method of controlling a battery protection circuit. The circuit includes a battery management system for controlling charging and discharging of a battery, and a reset control circuit for controlling a reset operation of the battery management system. The method includes if the battery management system is in a normal state, applying a first voltage used by the battery management system to determine reset, to a reset prevention terminal for preventing reset of the battery management system, through the reset control circuit.

DETAILED DESCRIPTION OF CERTAIN INVENTIVE EMBODIMENTS

Figure 1:
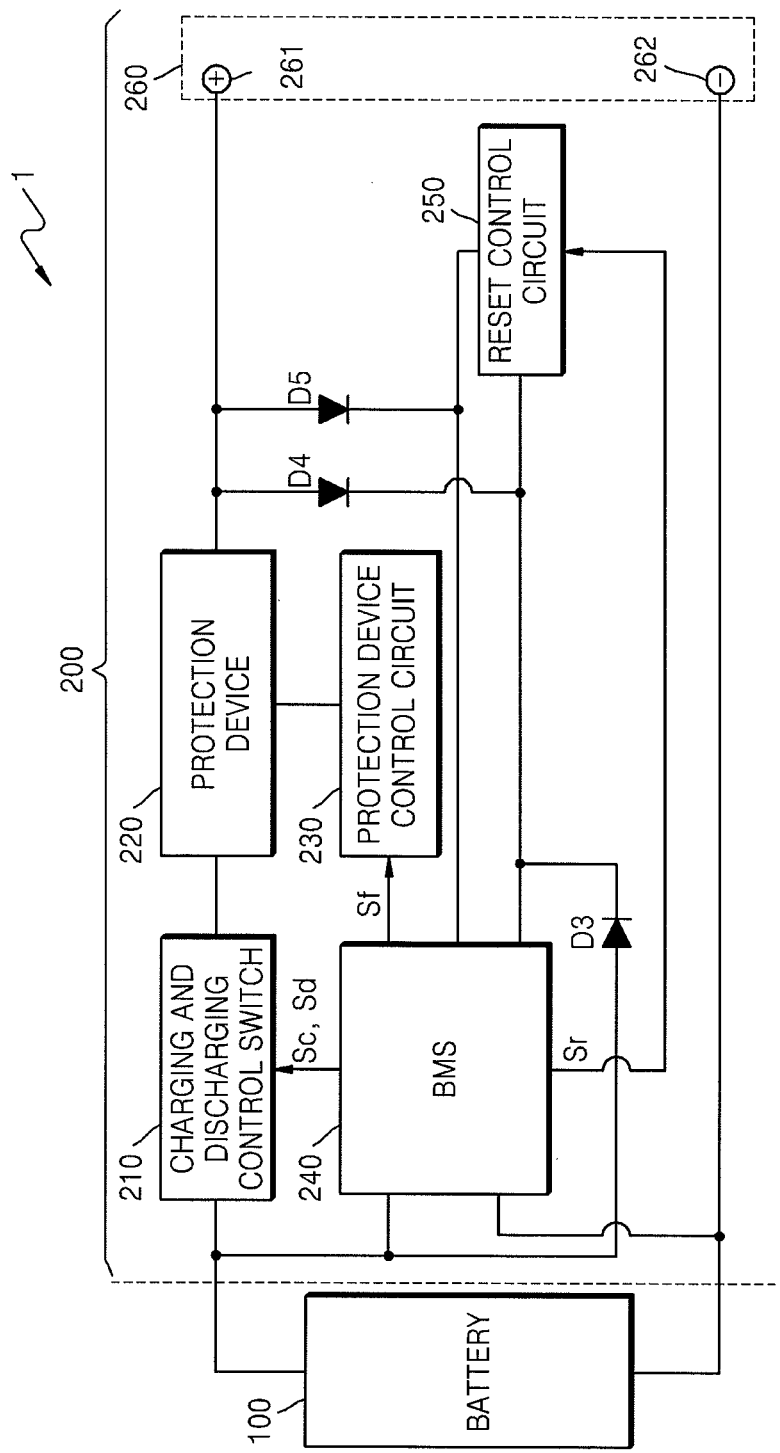
FIG. 1 is a block diagram of a battery pack according to an embodiment.

Various features and embodiments are described below, examples of which are illustrated in the accompanying drawings, wherein like reference numerals generally refer to like elements throughout. Embodiments may have different forms and should not be construed as being limited to the descriptions set forth herein. Accordingly, the embodiments are described below, with reference to the figures, to explain certain inventive aspects and features. Also, detailed descriptions of related well-known functions or configurations that may diminish the clarity of the points of the present invention may be omitted.

FIG. 1 is a block diagram of a battery pack 1 according to an embodiment. The battery pack 1 includes a battery 100 and a battery protection circuit 200. The battery protection circuit 200 includes a charging and discharging control switch 210, a protection device 220, a protection device control circuit 230, a battery management system (BMS) 240, a reset control circuit 250, and a terminal unit 260.

The battery 100 stores power, and supplies the stored power to an electronic device to which the battery pack 1 is connected. Also, if a charger is connected to the battery pack 1, the battery 100 may be charged by external power from the charger. The battery protection circuit 200 controls charging and discharging of the battery 100, and controls overall operations of the battery pack 1.

The charging and discharging control switch 210 is formed on a high current path through which charging current and discharging current flow. The switch 210 controls flows of the charging and discharging currents.

The protection device 220 permanently blocks charging and discharging currents by blocking the high current path. The protection device 220 may be a secondary protection device that is activated if an abnormal state of the battery pack 1 continues while the charging and discharging control switch 210 is blocking a charging or discharging operation. A fuse may be used as the protection device 220. The protection device control circuit 230 controls the protection device 220 to block the high current path. The protection device 220 blocks the high current path according to signals from the protection device control circuit 230.

The BMS 240 performs functions, such as controlling charging and discharging of the battery 100, and controlling balancing of battery cells 110 in the battery 100. The BMS 240 monitors a charging or discharging state of the battery 100, a current flow state inside the battery pack 1, etc. Also, the BMS 240 may measure an intermediate voltage between the battery cells 110. The BMS 240 controls the balancing of the battery cells 110 and the charging and discharging of the battery 100 according to results of the monitoring or the measuring. The BMS 240 may also determine that the battery pack 1 is in a normal state if the monitoring or the measuring is found to be within specified limits. If outside the specified limits the BMS 240 determines that the battery pack 1 is in an abnormal state.

The BMS 240 generates a charge control signal Sc and a discharge control signal Sd to control the charging and discharging control switch 210, and generates a protection control signal Sf to control the protection device control circuit 230. Also, the BMS 240 generates a reset control signal Sr to control the reset control circuit 250, which controls shutdown and reset operations of the BMS 240. The reset control circuit 250 controls a reset operation of the BMS 240 according to the reset control signal Sr.

According to the current embodiment, the BMS 240 controls all elements of the battery pack 1, but alternatively, the battery pack 1 may further include an analog front end (not shown) for monitoring a state of the battery 100 and controlling operations of the charging and discharging control switch 210, and the BMS 240 may control the analog front end.

The terminal unit 260 connects the battery pack 1 to an external device. The external device may be, for example, an electronic device or a charger. The terminal unit 260 includes a positive terminal 261 and a negative terminal 262. A charging current flows into the positive terminal 261, and a discharging current flows out from the positive terminal 261. On the other hand, the charging current may instead flow out from the negative terminal 262 and the discharging current may instead flow into the negative terminal 262. Although not shown in FIG. 1, the terminal unit 260 may further include a terminal for transmitting data to the external device or receiving a signal, such as a control signal, from the external device. Also, in FIG. 1, the terminal unit 260 includes a pair of the positive and negative terminals 261 and 262, but alternatively, the terminal unit 260 may separately include a terminal for discharging and a terminal for charging.

Figure 2:
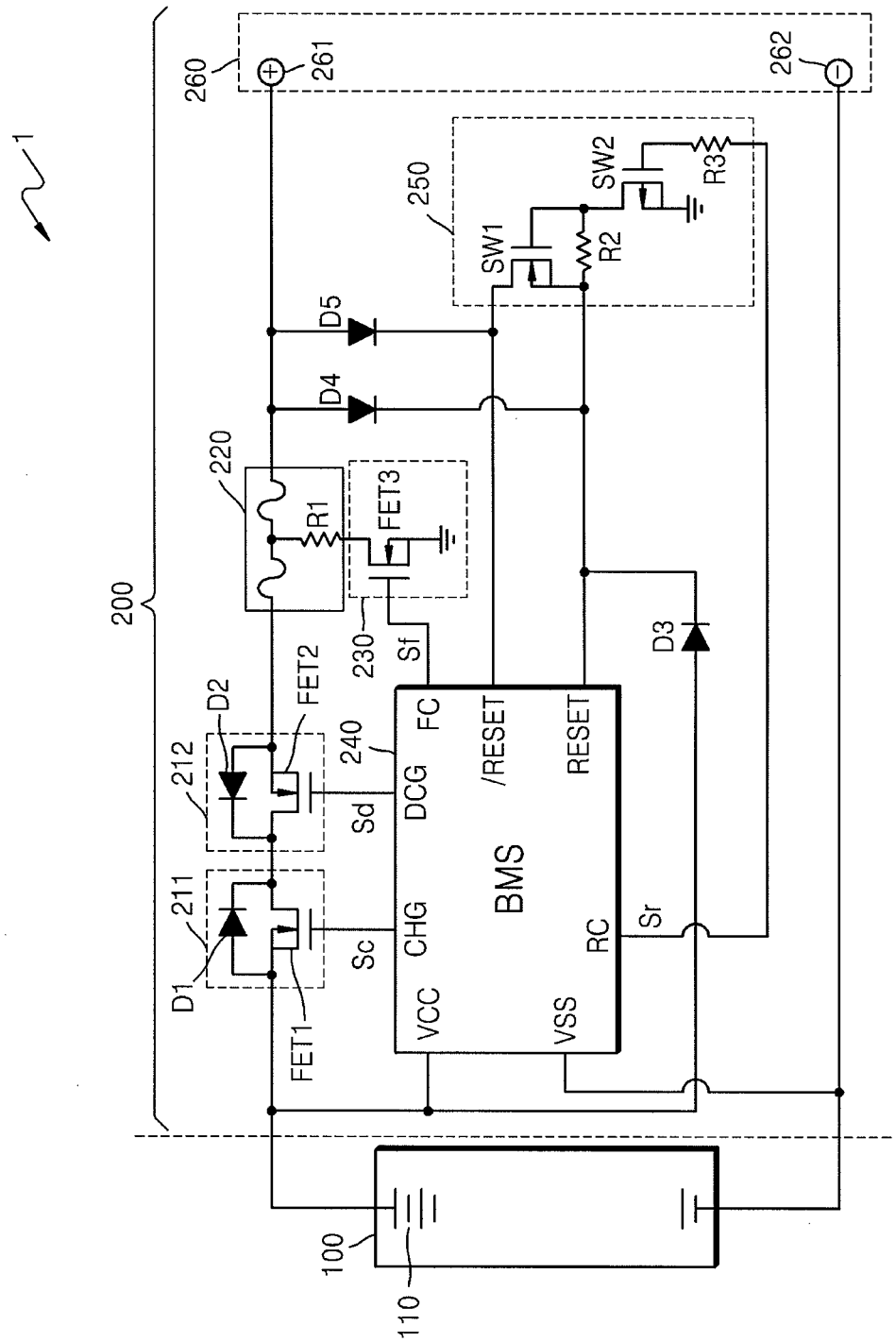
FIG. 2 is a circuit diagram illustrating embodiments of certain elements of the battery pack of FIG. 1.

Hereinafter, operations of the battery protection circuit 200 will now be described with reference to a detailed circuit structure of the battery pack 1. FIG. 2 is a circuit diagram illustrating the battery pack 1 of FIG. 1 with embodiments of certain elements.

The battery 100 may include at least one battery cell 110. The battery cell 110 may be a chargeable secondary battery, such as a nickel-cadmium battery, a lead accumulator, a nickel metal hydride battery (NiMH), a lithium ion battery, or a lithium polymer battery.

The charging and discharging control switch 210 may include a charge control switch 211 and a discharge control switch 212. The charge control switch 211 controls a flow of a charging current by using the charge control signal Sc. The charge control switch 211 includes a field-effect transistor FET1 and a parasitic diode D1. The field-effect transistor FET1 limits a current flow from the positive terminal 261 to the battery 100, or from the battery 100 to the negative terminal 262. In other words, the field-effect transistor FET1 is used to block the charging current from flowing. Here, the field-effect transistor FET1 is configured such that the discharging current flows through the parasitic diode D1.

The discharge control switch 212 controls a flow of a discharging current by using the discharge control signal Sd. The discharge control switch 212 includes a field-effect transistor FET2 and a parasitic diode D2. The field-effect transistor FET2 limits a current flow from the negative terminal 262 to the battery 100, or from the battery 100 to the positive terminal 261. In other words, the FET2 is used to block the discharging current from flowing. Here, the field-effect transistor FET2 is configured such that the charging current flows through the parasitic diode D2. A connecting direction of source and drain electrodes of the field-effect transistor FET2 and a connecting direction of source and drain electrodes of the field-effect transistor FET1 are opposite to each other.

The charge control switch 211 and the discharging control switch 212 are switching devices, and are not limited to field-effect transistors, but may be any device for performing a switching function.

The protection device 220 permanently blocks the high current path to prohibit reuse of the battery pack 1. A fuse may be used as the protection device 220.

The protection device 220 is formed between the charging and discharging control switch 210 and the positive terminal 261 of the terminal unit 260 on the high current path. If the battery 100 malfunctions, the protection device 220 is activated so that a charging or discharging current does not flow.

If the protection device 220 is a fuse, a resistor R1 included with the fuse may be connected between the high current path and ground. When a current equal to or above a predetermined level flows through the resistor R1, the fuse melts due to heat generated in the resistor R1, thereby blocking the current flow.

The protection device control circuit 230 blows the fuse by providing a current through the resistor R1 included in the fuse. The protection device control circuit 230 is formed between the protection device 220 and the ground, and is turned on in response to receiving the signal Sf from the BMS 240, thereby providing a current through the resistor R1. The protection device control circuit 230 may include a field-effect transistor FET3.

The BMS 240 may include a power supply terminal VCC, a ground terminal VSS, charge control terminal CHG, a discharge control terminal DCG, and a protection device control terminal FC.

A power supply voltage and a ground voltage are respectively applied to the power supply terminal VCC and the ground terminal VSS. When the battery pack 1 malfunctions, the charge control terminal CHG and the discharge control terminal DCG output the charge control signal Sc for controlling operations of the charge control switch 211 or the discharge control signal Sd for controlling operations of the discharge control switch 212.

The control terminal FC outputs the control signal Sf enabling the protection device 220 to block the high current path, and applies the control signal Sf to a gate electrode of the field-effect transistor FET3 included in the control circuit 230. The field-effect transistor FET3 is turned on upon receiving a high level logic signal as the control signal Sf, thereby providing a current through the resistor R1 and opening the fuse.

Although not shown in FIG. 2, the BMS 240 may include terminals for measuring an intermediate voltage and monitoring a charging or discharging state or a current flow. The BMS 240 may include a reset terminal RESET, a reset prevention terminal /RESET, and a reset control terminal RC.

The BMS 240 senses a voltage applied to the reset terminal RESET so as to determine shutdown or reset of the BMS 240. When the voltage applied to the reset terminal RESET is, for example, below or equal to a first reference value, the BMS 240 determines that the battery pack 1 has malfunctioned, stops operations of the battery pack 1, and shuts down. The reset terminal RESET may be connected to the power supply terminal VCC, and thus the same voltage applied to the power supply terminal VCC may be applied to the reset terminal RESET.

A diode D3 may be formed between the power supply terminal VCC and the reset terminal RESET so as to prevent a current from flowing backward. Also, a diode D4 may be located between the reset terminal RESET and the positive terminal 261 so that a voltage of the high current path is applied to the reset terminal RESET.

The BMS 240 determines prevention of reset of the BMS 240 by sensing a voltage applied to the reset prevention terminal /RESET. If the applied voltage is equal to or above a second reference value, the reset prevention terminal /RESET reactivates the BMS 240 if the BMS 240 has been shut down. In some embodiments, if the applied voltage is equal to or above the second reference value and is continuously applied to the reset prevention terminal /RESET, the BMS 240 is not shut down and continues to operate even if a voltage below or equal to the first reference value is applied to the reset terminal RESET. In other words, when a voltage equal to or above the second reference value is applied to the reset prevention terminal /RESET, an unintended reset operation of the BMS 240 may be prevented. Here, the second reference value may be different from the first reference value. A diode D5 is formed between the reset prevention terminal /RESET and the positive terminal 261, so that a voltage of the high current path is applied to the reset prevention terminal /RESET.

The BMS 240 generates and outputs the reset control signal Sr to the reset control circuit 250 through the reset control terminal RC, and forms or blocks a connection between the reset terminal RESET and the reset prevention terminal /RESET by using the reset control signal Sr.

When the battery pack 1 is in a normal state, the BMS 240 generates the reset control signal Sr such that the reset control circuit 250 applies a voltage applied to the reset terminal RESET to the reset prevention terminal /RESET, so as to prevent an unintended reset operation of the BMS 240.

Alternatively, when the BMS 240 is to be shut down because the battery pack 1 is in an abnormal state, the BMS 240 generates the reset control signal Sr such that the reset control circuit 250 blocks a voltage applied to the reset terminal RESET from being applied to the reset prevention terminal /RESET.

The reset control circuit 250 controls a reset operation of the BMS 240 according to the reset control signal Sr, and may include a first switch SW1 and a second switch SW2.

Regarding the first switch SW1, a first electrode may be connected to the reset prevention terminal /RESET, and a second electrode may be connected to the reset terminal RESET. Also, a resistor R2 may be disposed between the second electrode and a control electrode of the first switch SW1. A p-channel metal-oxide semiconductor field-effect transistor (PMOS FET) may be used as the first switch SW1, the first electrode may be a drain electrode, and the second electrode may be a source electrode.

Regarding the second switch SW2, a first electrode may be connected to the control electrode of the first switch SW1, and a second electrode may be connected to the ground. Also, a control electrode of the second switch SW2 may be connected to the reset control terminal RC. Here, a resistor R3 may be disposed between the control electrode of the second switch SW2 and the reset control terminal RC. An n-channel metal-oxide semiconductor field-effect transistor (NMOS FET) may be used as the second switch SW2, the first electrode may be a drain electrode, and the second electrode may be a source electrode.

Functionality of the reset control circuit 250 is described in detail with reference to FIGS. 3 and 4. Certain elements are referenced to describe the functionality of the reset control circuit 250 and are shown in FIGS. 3 and 4, and certain unnecessary elements may be omitted.

Figure 3:
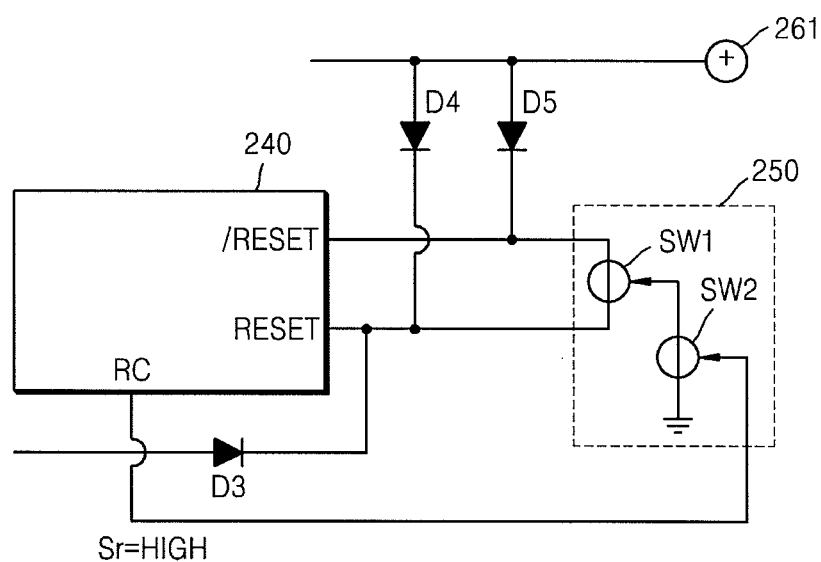
FIG. 3 is a schematic diagram of a battery protection circuit, according to an embodiment.
Figure 4:
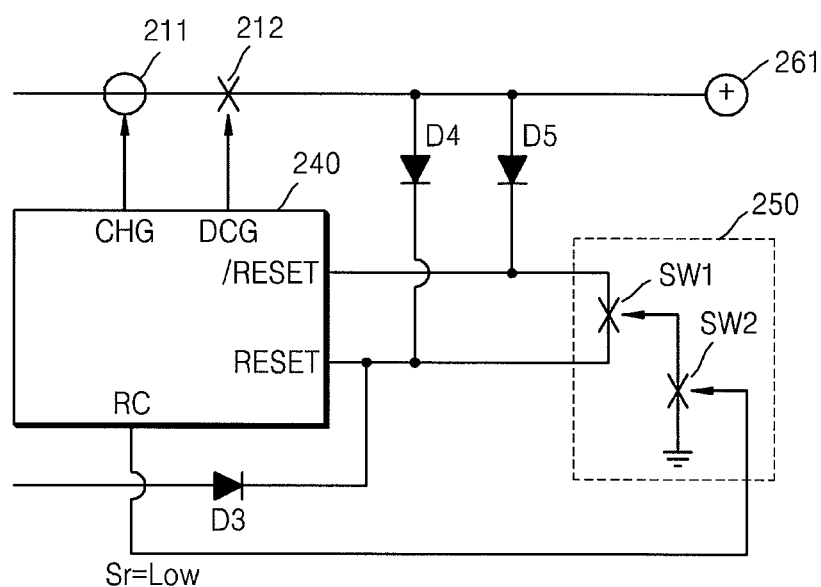
FIG. 4 is a schematic diagram of a battery protection circuit, according to another embodiment.

FIG. 3 is a schematic diagram of the battery protection circuit 200, according to an embodiment. In FIG. 3, the battery pack 1 is in a normal state.

Referring to FIG. 3, when the battery pack 1 is in a normal state, a user does not want the BMS 240 to reset or shut down. Accordingly, the BMS 240 generates and outputs a high level signal as the reset control signal Sr, and the output reset control signal Sr is applied to the control electrode of the second switch SW2.

Because an NMOS FET is used as the second switch SW2, a voltage between the control electrode and the second electrode constituting the source electrode of the second switch SW2 is equal to or above a threshold voltage, and the second switch SW2 is turned on. Because the second switch SW2 is turned on, a ground voltage is applied to the control electrode of the first switch SW1 through the first electrode constituting the drain electrode of the second switch SW2.

Because a PMOS FET is used as the first switch SW1, an absolute value of a voltage between the control electrode of the first switch SW1 and the second electrode constituting the source electrode of the first switch SW1 is equal to or above a threshold voltage, and the first switch SW1 is turned on. Accordingly, the reset terminal RESET and the reset prevention terminal /RESET are connected to each other through the first switch SW1, and a voltage applied to the reset terminal RESET is applied to the reset prevention terminal /RESET.

Generally, when static electricity, a surge current, or the like is generated in the battery pack 1, a level of a voltage applied to the reset terminal RESET fluctuates, and if the voltage temporarily decreases to the first reference value or below, the BMS 240 is unintentionally shut down. In response, the BMS 240 turns off the discharge control switch 212 to block a discharge path and thus a voltage of the battery 100 is prevented from being applied to the reset prevention terminal /RESET. Accordingly, in order to activate the BMS 240 again, a charger is connected to the terminal unit 260 in order to apply an external voltage to the reset prevention terminal /RESET through the high current path. However, as described above, the reset terminal RESET and the reset prevention terminal /RESET are connected to each other by the reset control circuit 250, and thus an unintended shut down or reset operation of the BMS 240 is prevented.

FIG. 4 is a schematic diagram for describing an operation of the battery protection circuit 200, according to another embodiment. In FIG. 4, the battery pack 1 is in an abnormal state.

Referring to FIG. 4, when the battery pack 1 is in an abnormal state, for example, when the battery pack 1 is overheated, the BMS 240 is shut down to stop the charging or discharging operation. Accordingly, the BMS 240 generates and outputs a low level signal as the reset control signal Sr, and the output reset control signal Sr is applied to the control electrode of the second switch SW2.

Because an NMOS FET is used as the second switch SW2, a voltage between the control electrode of the second switch SW2 and the second electrode constituting the source electrode of the second switch SW2 is below a threshold voltage, and the second switch SW2 is turned off. When the second switch SW2 is turned off, a connection between the ground and the control electrode of the first switch SW1 is blocked.

Because a PMOS FET is used as the first switch SW1, an absolute value of a voltage between the control electrode of the first switch SW1 and the second electrode constituting the source electrode of the first switch SW1 is below a threshold voltage, and the first switch SW1 is turned off. Accordingly, a connection between the reset terminal RESET and the reset prevention terminal /RESET is blocked.

Because the battery pack 1 is in an abnormal state, the BMS 240 outputs the discharge control signal Sd, which turns off the discharge control switch 212 through the discharge control terminal DCG, to block the high current path from the battery 100 to the positive terminal 261, thereby preventing a voltage of the battery 100 from being applied to the reset prevention terminal /RESET.

As described above, by blocking a connection between the reset terminal RESET and the reset prevention terminal /RESET via control of the reset control circuit 250, the BMS 240 may be shut down or reset when a shutdown or reset operation of the BMS 240 is required.

Figure 5:
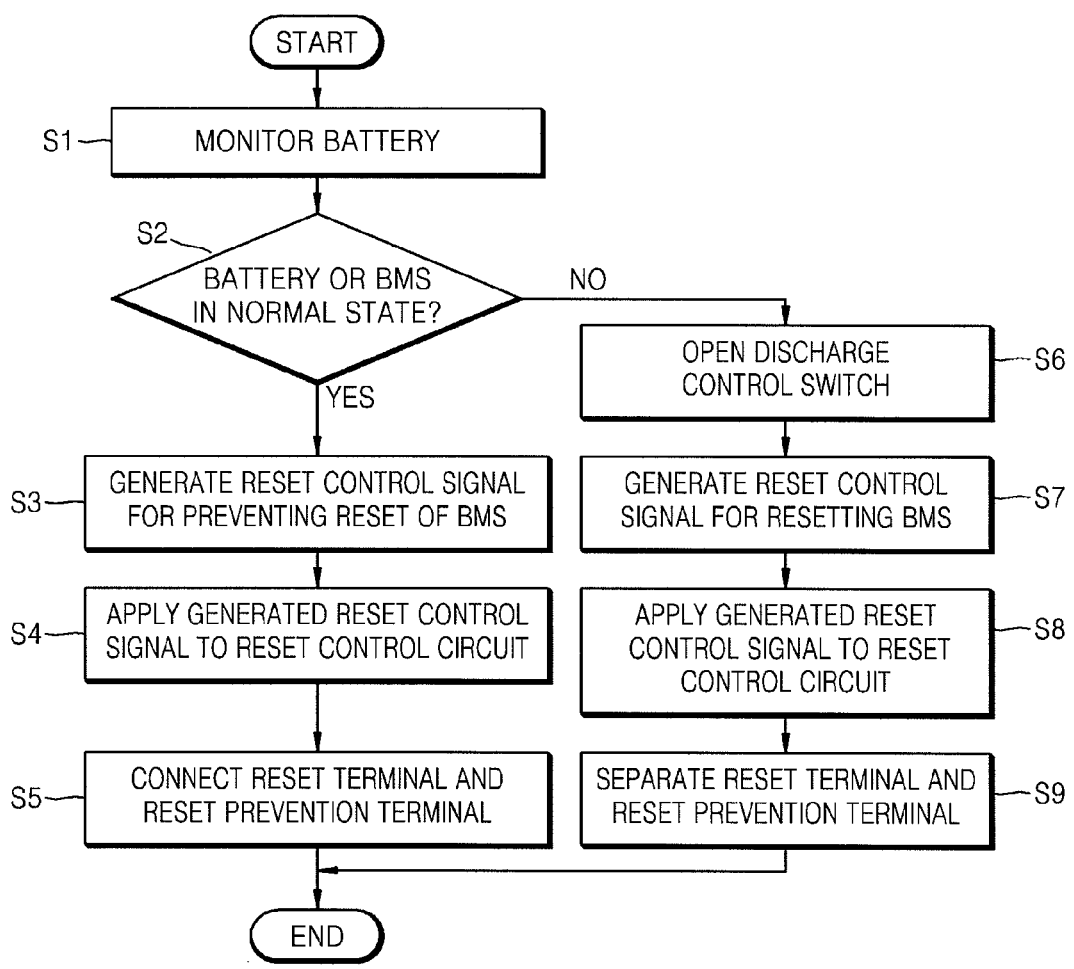
FIG. 5 is a flowchart illustrating a method of controlling a battery protection circuit, according to an embodiment.

FIG. 5 is a flowchart illustrating a method of controlling the battery protection circuit 200, according to an embodiment. Referring to FIG. 5, the BMS 240 monitors a voltage of the battery 100 or a current in the battery pack 1, in operation S1, and determines whether the battery 100 or the BMS 240 is in a normal state based on a result of the monitoring, in operation S2.

If the battery 100 or the BMS 240 is in a normal state, the reset control signal Sr for preventing reset of the BMS 240 is generated in operation S3, and the generated reset control signal Sr is applied to the reset control circuit 250 in operation S4.

According to the applied reset control signal Sr, the reset control circuit 250 connects the reset terminal RESET and the reset prevention terminal /RESET to each other so that the same voltage is applied to the reset terminal RESET and the reset prevention terminal /RESET, in operation S5.

If the battery 100 or the BMS 240 are in an abnormal state in operation S2, the discharge control signal Sd for turning off the discharge control switch 212 is applied to the discharge control switch 212 to open the discharge control switch 212 in operation S6. Also, the reset control signal Sr for resetting the BMS 240 is generated in operation S7, and the generated reset control signal Sr is applied to the reset control circuit 250 in operation S8. According to the applied reset control signal Sr, the reset control circuit 250 blocks a connection between the reset terminal RESET and the reset prevention terminal /RESET, thereby shutting down the BMS 240, in operation S9.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery protection circuit comprising:
    a battery management system configured to control charging and discharging of a battery; and
    a reset control circuit configured to control resetting the battery management system,
    wherein the battery management system comprises:
        a reset terminal to which a first voltage for determining reset is applied; and
        a reset prevention terminal to which a second voltage for determining reset prevention of the battery management system is applied,
        wherein the reset control circuit is connected between the reset terminal and the reset prevention terminal to control applying the first voltage to the reset prevention terminal and;
    wherein the reset control circuit comprises:
        a first transistor comprising a first electrode connected to the reset prevention terminal, a second electrode connected to the reset terminal, and a control electrode; and
        a second transistor comprising a first electrode connected to the control electrode of the first transistor, a second electrode connected to ground, and a control electrode to which a reset control signal is applied.

2. The battery protection circuit of claim 1, wherein, if the battery management system is in a normal state, the reset control circuit connected the reset terminal and the reset prevention terminal to each other.

3. The battery protection circuit of claim 2, wherein the battery management system is configured to monitor at least one of a voltage and a current of the battery, and to determine whether the battery management system is in a normal state based on the monitored voltage or current.

4. The battery protection circuit of claim 1, wherein the battery management system further comprises a reset control terminal for outputting the reset control signal, and the reset control terminal is connected to the control electrode of the second transistor.

5. The battery protection circuit of claim 1, wherein the first transistor is a p-channel metal-oxide semiconductor field-effect transistor (MOSFET) (PMOS), and the second transistor is an n-channel MOSFET (NMOS).

6. The battery protection circuit of claim 5, wherein the battery management system generates a high level signal as the reset control signal if the battery management system is in a normal state, and generates a low level signal as the reset control signal if the battery management system is in an abnormal state.

7. The battery protection circuit of claim 6, wherein the battery management system is configured to monitor at least one of a voltage and a current of the battery, and to determine whether the battery management system is in a normal state based on the monitored voltage or current.

8. A battery protection circuit comprising:
    a battery management system configured to control charging and discharging of a battery; and
    a reset control circuit configured to control resetting of the battery management system,
    wherein the battery management system comprises:
        a reset prevention terminal to which a first voltage for determining reset prevention of the battery management system is applied; and
        a reset control terminal for outputting a reset control signal for controlling reset of the battery management system,
        wherein the reset control circuit controls application of a voltage to the reset prevention terminal according to the reset control signal;
    wherein the battery management system further comprises a reset terminal to which a second voltage for determining reset is applied, and wherein the reset control circuit applies the second voltage to the reset prevention terminal according to the reset control signal; and
    wherein if the battery management system is in a normal state, the reset control circuit connects the reset terminal and the reset prevention terminal to each other, and if the battery management system is in an abnormal state, the reset control circuit disconnects the reset terminal and the reset prevention terminal
    wherein the reset control circuit comprises:
        a first transistor comprising a first electrode connected to the reset prevention terminal, a second electrode connected to the reset terminal, and a control electrode; and a second transistor comprising a first electrode connected to the control electrode connected to ground, and a control electrode connected to the reset control terminal.

9. The battery protection circuit of claim 8, wherein the first transistor is a p-channel metal-oxide semiconductor field-effect transistor (MOSFET) (PMOS), and the second transistor is an n-channel MOSFET (NMOS).

10. The battery protection circuit of claim 9, wherein the battery management system generates a high level signal as the reset control signal if the battery management system is in a normal state, and generates a low level signal as the reset control signal if the battery management system is in an abnormal state.

11. The battery protection circuit of claim 10, wherein the battery management system is configured to monitor at least one of a voltage and a current of the battery, and to determine whether the battery management system is in a normal state based on the monitored voltage or current.

12. A method of controlling a battery protection circuit comprising a battery management system for controlling charging and discharging of a battery, and a reset control circuit for controlling a reset operation of the battery management system, the method comprising:
 monitoring at least one of a voltage and a current of the battery, and determining whether the battery management system is in a normal state based on the monitored voltage or current;
 if the battery management system is in a normal state, applying a first voltage used by the battery management system to determine reset, to a reset prevention terminal for preventing reset of the battery management system, through the reset control circuit; and
 if the battery management system is in an abnormal state, blocking, by the reset control circuit, the first voltage from the reset prevention terminal.

13. The method of claim 12, wherein the battery management system blocks a discharge path for externally discharging power from the battery if the battery management system is in an abnormal state.

* * * * *